United States Patent Office 2,839,559
Patented June 17, 1958

2,839,559

PREPARATION OF ORGANIC ISOCYANATES

Edgar E. Hardy, New Martinsville, W. Va.

No Drawing. Application October 30, 1956
Serial No. 619,122

13 Claims. (Cl. 260—453)

This invention relates generally to isocyanates and more particularly to an improved method for making an organic isocyanate.

An organic isocyanate is ordinarily prepared by reacting an amine with phosgene. The reaction does not take place as straightforwardly as might be expected from the chemical equation representing the reaction because some of the isocyanate formed may react with the amine and form a substituted urea. In order to avoid substituted urea formation as much as possible, it has been proposed that the reaction be conducted in two steps with the first step at a temperature near 0° C. and the second step at a higher temperature. In such a two-step process, a carbamyl chloride and hydrogen chloride are formed and the carbamyl chloride is then converted in the second step at the higher temperature into the isocyanate with the evolution of hydrogen chloride. Such a two-step process is costly, however, and has the further disadvantage that side reactions frequently occur unless the reaction is most carefully controlled. Although the formation of substituted ureas can be substantially avoided by converting the amine into the hydrochloride salt thereof before phosgenation, such a process is undesirable because, inter alia, the hydrochloride salt forms a thick mass of crystals which cannot be handled satisfactorily unless excessively large amounts of solvents are utilized.

It is therefore an object of this invention to provide an improved process for preparing organic isocyanates devoid of the foregoing disadvantages. Another object of the invention is to provide a process for preparing organic polyisocyanates, either aliphatic or aromatic, at relatively low temperatures and without any substantial formation of substituted ureas. A further object of the invention is to provide a method for preparing an isocyanate from an organic polyamine in improved yields based on the amount of polyamine utilized.

The foregoing objects and others that will become apparent from the following description are accomplished in accordance with this invention, generally speaking, by providing a method for preparing an organic polyisocyanate from a polyamine by first forming a sulfur dioxide salt of the amine and thereafter reacting the resulting sulfur dioxide adduct with a carbonyl halide to form a polyisocyanate. It has been found that polyisocyanates consistently above 92% purity can be obtained in accordance with such a process, whereas the conventional phosgenation of the amine frequently produces polyisocyanate crudes containing as low as 84% to 87% chemically pure polyisocyanate. Moreover, the yield of pure product obtained in accordance with this invention is consistently 90% or above based on the weight of amine used.

The reactions may be carried out in conventional equipment provided with means for temperature control and for evacuation. Although the invention contemplates a process in which any carbonyl halide, such as, for example, phosgene, carbonyl fluoride or carbonyl bromide, may be utilized alone or in mixtures thereof, it is preferred to use phosgene for converting the sulfur dioxide salt of the polyamine into the polyisocyanate.

In practicing the invention the polyamine is dissolved in any suitable solvent, such as, for example, orthodichlorobenzene, monochlorobenzene, benzene, toluene, xylene and the like. Complete dissolution of the polyamine may be obtained by permitting the amine and solvent to stand at room temperature, but the amine will dissolve in the solvent much more readily if the mixture is heated to a temperature of up to about 50° C. For best results, the temperature must be 45° C. or less while the sulfur dioxide is bubbled through the solution of the polyamine. Otherwise, the yield is adversely affected.

Ordinarily more than the theoretical amount of sulfur dioxide must be utilized in order to achieve complete conversion. Usually from about 1.5 to about 3 mols $SO_2$ should be utilized per amino group per mol of polyamine to insure complete conversion of the amine into the $SO_2$ adduct. In other words, if the diamine is used, about 3 to 4 mols $SO_2$ per mol of amine should be utilized.

The temperature of the $SO_2$ salt slurry is adjusted by cooling to less than 30° C. and a carbonyl halide, for example, phosgene, is then added. The solution is adjusted to a temperature of 30° to 90° C. and a carbamyl-HCl salt is formed. Additional phosgene is then added and the temperature is adjusted to from about 90° C. to about 180° C. After conversion of the $SO_2$ adduct into the corresponding isocyanate in this way, excess phosgene is removed from the solution by bubbling any suitable inert gas, such as, for example, nitrogen or natural gas, therethrough while at a temperature in the neighborhood of 150° C. and the solvent is removed by distillation at a pressure less than atmospheric. An excess of the carbonyl halide, such as phosgene, of up to about 5 mols per mol of $SO_2$ adduct is used to insure complete conversion of the adduct into the isocyanate.

It has been found that the sulfur dioxide salt of an organic polyamine is a stable compound with a low dissociation temperature of from about 45° to about 60° C. and that, because of this property, displacement of the $SO_2$ adduct and formation of the carbamyl chloride-HCl salt of the polyamine can be achieved at a controlled rate and at low free amine concentration. The chance for interreaction of the carbamyl chloride with an amine to form ureas is minimized in solutions of low concentration so the process does not result in the formation of any substantial amount of substituted ureas. Moreover, the slurry of the $SO_2$ adduct of the polyamine is very uniform in consistency and can be adequately agitated during the reaction of the aduct with phosgene to insure complete reaction with the formation of little or no side reaction products.

The steps in the chemical reaction involved in the process of this invention may be represented by the following equation when p,p'-diaminodiphenylmethane is used as the polyamine and phosgene as the carbonyl halide:

(1) 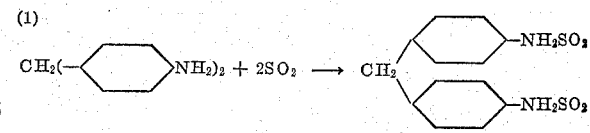

(2) 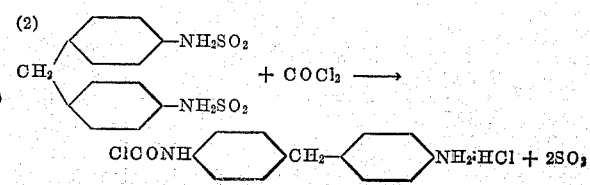

(3) 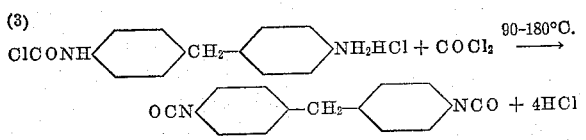

In order better to describe and to clarify further the invention, the following is a description of one embodiment thereof:

About 200 parts by weight of p,p'-diaminodiphenylmethane are placed in a vessel and about 2000 parts by weight o-chlorobenzene are then added. The resulting mixture is heated to about 50° C. and maintained at this temperature until the polyamine has completely dissolved. About 225 parts by weight sulfur dioxide gas are then bubbled slowly through the solution while it is maintained at a temperature of about 50° to 60° C. Ordinarily from about 1 hour to one hour and a half is required for the proper addition of the sulfur dioxide to the solution. The reaction between the p,p'-diaminodiphenylmethane is rapid and only slightly exothermic, so under some conditions no refrigeration is required. The sulfur dioxide salt precipitates as it is formed and a slurry of finely divided crystals having a uniform consistency of the sulfur dioxide adduct is obtained.

After all of the polyamine has been converted into the SO₂ adduct thereof, the slurry is cooled to a temperature of less than 30° C. and preferably to a temperature of about 15° C. Phosgene is added at a rate of about 600 cubic centimeters per minute for about one hour and twenty minutes as the temperature is maintained near the stated temperature. The temperature is then increased gradually as additional phosgene is added at the same rate until a total of about 5.5 mols have been utilized. The temperature is increased to about 150° C. during the addition of the phosgene. The slurry becomes thinner as phosgene is added and the temperature is increased and is usually free from any precipitate by the time the temperature of 150° C. has been reached.

The resulting solution of p,p'-diisocyanatodiphenylmethane is degassed by bubbling an inert gas, such as natural gas, therethrough for about one hour while maintaining the temperature at about 150° C. After degassing, the solvent is removed by conventional vacuum distillation methods with the pressure in the vessel being gradually reduced to about 5 to 10 mm. mercury as distillation proceeds. Distillation is started at a pressure of about 74 mm. mercury and a solution temperature of about 105° C. and as the pressure is further reduced the temperature falls from about 105° C. to a point within the range of from about 85° C. to 100° C. About 227 parts by weight polyisocyanate are recovered by filtering the solution. This product is about 93% or more pure p,p'-diisocyanatodiphenylmethane.

In other embodiments of the invention a similar processing technique is followed but any other suitable diamine may be substituted for the p,p'-diaminodiphenylmethane. For example, 2,4-toluylene diamine, 2,6-toluyene diamine, mixtures thereof; benzidene; methylene diamine; ethylenediamine; the propylene di-, tri- and tetraamines; p-aminobenzylamine; the xylene diamines; benzene triamine; 4,4'4''-triphenylmethanetriamine; cyclohexyldiamine and the like may be utilized.

Although the invention has been described in considerable detail in the foregoing with reference to specific embodiments thereof, such detail has been presented solely for the purpose of illustration and modifications can be made therein by those skilled in the art without departing from the spirit and scope of the invention except as is set forth in the claims.

What is claimed is:

1. A method for preparing a polyisocyanate comprising reacting a primary polyamine selected for the group consisting of aromatic, aliphatic and cycloaliphatic primary polyamines with sulfur dioxide, said polyamine having amino groups as its only groups reactive with sulfur dioxide, and thereafter reacting the resulting sulfur dioxide salt of the polyamine with a carbonyl halide to form a polyisocyanate.

2. In a method for making a polyisocyanate from a primary polyamine selected from the group consisting of aromatic, aliphatic and cycloaliphatic primary polyamines and a carbonyl halide, the improvement which comprises converting the polyamine into a sulfur dioxide salt and then reacting the salt with a carbonyl halide to form a polyisocyanate, said polyamine having amino groups as its only groups reactive with sulfur dioxide.

3. A method for preparing a polyisocyanate comprising reacting a primary polyamine selected from the group consisting of aromatic, aliphatic and cycloaliphatic primary polyamines with sulfur dioxide, said polyamine having amino groups as its only groups reactive with sulfur dioxide, and thereafter reacting the resulting sulfur dioxide salt of the amine with phosgene to form the polyisocyanate.

4. In a method for making a polyisocyanate from a primary polyamine and carbonyl halide, the improvement which comprises converting a polyamine selected from the group consisting of aromatic, aliphatic and cycloaliphatic primary polyamines into a sulfur dioxide salt and then reacting the salt with phosgene to form a polyisocyanate, said polyamine having amino groups as its only groups reactive with sulfur dioxide.

5. A method for preparing a polyisocyanate which comprises reacting a primary polyamine selected from the group consisting of aromatic, aliphatic and cycloaliphatic primary polyamines with sulfur dioxide in a solvent therefor at temperatures not substantially above 60° C., said polyamine having amino groups as its only groups reactive with sulfur dioxide, cooling the resulting solution of sulfur dioxide salt to a temperature within the range of about 0° to about 30° C. and adding phosgene thereto in a ratio of at least about one mol phosgene per mol of salt, heating the slurry to a temperature of between about 30° and about 90° C. until the sulfur dioxide in the said salt has been replaced by the phosgene and thereafter raising the temperature of the slurry to a point up to about 180° C. while adding at least one more mol of phosgene per mol of the addition product until a polyisocyanate is formed.

6. The method of claim 4 wherein the polyisocyanate is formed from an aromatic polyamine.

7. The process of claim 4 wherein the polyisocyanate is formed from an aliphatic polyamine.

8. The process of claim 4 wherein toluene diisocyanate is formed and the polyamine is toluene diamine.

9. A method for preparing p,p'-diisocyanatodiphenylmethane which comprises reacting p,p'diaminodiphenylmethane with sulfur dioxide to form a sulfur dioxide adduct of the said diamine, and thereafter reacting the said adduct with phosgene to form the said diisocyanate.

10. The process of claim 9 wherein at least 2 mols of phosgene per mol of adduct are utilized in the phosgenation process.

11. A method for making p,p'-diisocyanatodiphenylmethane which comprises dissolving p,p'-diaminodiphenylmethane in a solvent therefor, heating the resulting mixture to about 50° C. to 60° C. until the said diamine is dissolved, adding sulfur dioxide gas slowly to the resulting solution, cooling the resulting slurry of the sulfur dioxide salt of the said diamine to a temperature below 30° C., mixing the cold slurry with phosgene and heating the slurry until the sulfur dioxide salt of the diamine has been converted into a diisocyanate, and thereafter removing the solvent from the slurry at a pressure below atmospheric pressure.

12. A method for making p,p'-diisocyanatodiphenylmethane which comprises dissolving p,p'-diaminodiphenylmethane in chlorobenzene and adding sulfur dioxide gas thereto until the said diamine has been converted into a sulfur dioxide adduct, and thereafter reacting the adduct with phosgene to form p,p'-diisocyanatodiphenylmethane.

13. A method for making a polyisocyanate from a primary polyamine at relatively low temperatures and without any substantial amount of refrigeration in yields of above 90 percent comprising converting a polyamine selected from the group consisting of aromatic, aliphatic, and cycloaliphatic primary polyamines having amino groups as the only group reactive with sulfur dioxide into a sulfur dioxide salt thereof, and thereafter forming a polyisocyanate by reacting the said salt with a carbonyl halide.

References Cited in the file of this patent

UNITED STATES PATENTS

| | | |
|---|---|---|
| 1,726,252 | Wolffenstein | Aug. 27, 1929 |
| 2,680,129 | Flores | June 1, 1954 |
| 2,733,254 | Allen et al. | Jan. 31, 1956 |

OTHER REFERENCES

"German Plastics Practice," De Bell et al. (1946), p. 301.